United States Patent
Yamaguchi et al.

(10) Patent No.: US 12,551,905 B2
(45) Date of Patent: Feb. 17, 2026

(54) FOREIGN MATTER REMOVAL DEVICE

(71) Applicant: Mitsubishi Electric Corporation, Tokyo (JP)

(72) Inventors: Ryusei Yamaguchi, Tokyo (JP); Kota Kurihara, Tokyo (JP); Eiji Imamura, Tokyo (JP); Shigeru Iijima, Tokyo (JP); Masazumi Chisaki, Tokyo (JP); Yoshiro Aoyagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/992,443

(22) PCT Filed: Jul. 13, 2022

(86) PCT No.: PCT/JP2022/027574
§ 371 (c)(1),
(2) Date: Jan. 8, 2025

(87) PCT Pub. No.: WO2024/013885
PCT Pub. Date: Jan. 18, 2024

(65) Prior Publication Data
US 2025/0256291 A1    Aug. 14, 2025

(51) Int. Cl.
*B04C 5/081* (2006.01)
*B01D 19/00* (2006.01)
(Continued)

(52) U.S. Cl.
CPC .......... *B04C 5/081* (2013.01); *B01D 19/0057* (2013.01); *B01D 21/267* (2013.01);
(Continued)

(58) Field of Classification Search
CPC ............. B04C 5/081; B04C 5/04; B04C 5/13; B04C 5/15; B04C 5/103; B04C 2005/136; B01D 19/0057; B01D 21/267
See application file for complete search history.

(56) References Cited

U.S. PATENT DOCUMENTS

| | | | |
|---|---|---|---|
| 4,428,839 A | * | 1/1984 | Davies ............... B01D 19/0057 |
| | | | 210/512.3 |
| 5,116,488 A | | 5/1992 | Torregrossa |
| | | | (Continued) |

FOREIGN PATENT DOCUMENTS

| | | |
|---|---|---|
| DE | 102009016045 A1 | 10/2010 |
| JP | S56-073567 A | 6/1981 |

(Continued)

OTHER PUBLICATIONS

International Search Report and Written Opinion mailed on Aug. 23, 2022, received for International Application No. PCT/JP2022/027574, filed on Jul. 13, 2022, 10 pages including English Translation.

(Continued)

*Primary Examiner* — Liam Royce
(74) *Attorney, Agent, or Firm* — XSENSUS LLP

(57) ABSTRACT

A foreign matter removal device removes foreign matter contained in a fluid. The fluid is caused to flow into the trap portion and is separated into an inner fluid flowing inside a separation portion and an outer fluid flowing outside the separation portion. First foreign matter contained in the outer fluid and having a higher specific gravity than the fluid is captured in a gap between an inner wall of the trap portion and the separation portion. Separation of second foreign matter contained in the inner fluid and having a lower specific gravity than the fluid is promoted by a gas-liquid separation portion, and the second foreign matter is discharged to outside, through a foreign-matter-discharging- (Continued)

means-connection portion provided in a ceiling on the vertically upper side at a center part of the trap portion, from foreign-matter-discharging means.

20 Claims, 4 Drawing Sheets

(51) Int. Cl.
  *B01D 21/26* (2006.01)
  *B04C 5/04* (2006.01)
  *B04C 5/103* (2006.01)
  *B04C 5/13* (2006.01)
  *B04C 5/15* (2006.01)
(52) U.S. Cl.
  CPC .................. *B04C 5/04* (2013.01); *B04C 5/13* (2013.01); *B04C 5/15* (2013.01); *B04C 5/103* (2013.01); *B04C 2005/136* (2013.01)

(56) References Cited

U.S. PATENT DOCUMENTS

| 5,466,372 | A | 11/1995 | Jerabek et al. |
| 2006/0107837 | A1 | 5/2006 | Showalter et al. |
| 2007/0163442 | A1 | 7/2007 | Saito et al. |
| 2014/0251140 | A1 | 9/2014 | Sams et al. |

FOREIGN PATENT DOCUMENTS

| JP | 56168849 A | * | 12/1981 |
| JP | S62156382 A | * | 7/1987 |
| JP | S63-224753 A | | 9/1988 |
| JP | H02-045105 U | | 3/1990 |
| JP | H04-240288 A | | 8/1992 |
| JP | H11-123303 A | | 5/1999 |
| JP | 2000-312840 A | | 11/2000 |
| JP | 2007-127026 A | | 5/2007 |
| JP | 2007-187141 A | | 7/2007 |

OTHER PUBLICATIONS

Notice of Reasons for Refusal mailed on Dec. 13, 2022, received for JP Application 2022-565792, 8 pages including English Translation.
Notice of Reasons for Refusal mailed on Apr. 4, 2023, received for JP Application 2022-565792, 8 pages including English Translation.
Decision to Grant mailed on Aug. 16, 2023, received for JP Application 2022-565792, 5 pages including English Translation.
Office Action issued Apr. 26, 2025 in Chinese Patent Application No. 202280097638.4.

* cited by examiner a b c d a b

FOREIGN MATTER REMOVAL DEVICE

CROSS-REFERENCE TO RELATED APPLICATION

This application is a national stage application, pursuant to 35 U.S.C. § 371, of International Patent Application No. PCT/JP2022/027574, filed Jul. 13, 2022, the entire contents of which are incorporated herein by reference.

TECHNICAL FIELD

The present disclosure relates to a foreign matter removal device.

BACKGROUND ART

There is known a foreign matter removal device which, when foreign matter contained in a fluid in a pipe is removed, uses swirling flows and gravity settling to remove the foreign matter (e.g., see Patent Document 1). The foreign matter removal device removes foreign matter such as iron rust, insoluble salts, and corrosion products contained in a fluid such as water flowing through a pipe, and contributes to inhibiting damage in the pipe.

The foreign matter removal device is used for a heat-pump type hot water supply heating system having a circulation water circuit in which an iron radiator, an iron pipe, and the like are used, for example. The iron radiator, the iron pipe, and the like of the circulation water circuit may generate foreign matter such as iron rust in the fluid in the circulation water circuit. Therefore, a conventional foreign matter removal device is used to remove foreign matter such as iron rust having a higher specific gravity than a fluid.

CITATION LIST

Patent Document

Patent Document 1: Japanese Laid-Open Patent Publication No. 2007-127026

SUMMARY OF THE INVENTION

Problem to be Solved by the Invention

However, in a circuit in which a fluid flows, not only foreign matter such as iron rust having a higher specific gravity than the fluid but also foreign matter such as air having a lower specific gravity than the fluid, may be generated. For example, in the above-described heat-pump type hot water supply heating system, air dissolved in a fluid in a circuit may occur as air bubbles through temperature rise depending on operation of the hot water supply heating system. The air bubbles which have occurred may also affect a pump, and thus a foreign matter removal device which also can more appropriately remove foreign matter such as air bubbles having a lower specific gravity than the fluid is required.

The present disclosure has been made to solve the above problem, and an object of the present disclosure is to provide a foreign matter removal device which can remove foreign matter such as iron rust having a higher specific gravity than a fluid, and has a further improved capability of removing foreign matter such as air bubbles having a lower specific gravity than a fluid.

Means to Solve the Problem

A foreign matter removal device according to the present disclosure removes foreign matter contained in a fluid in a pipe by using a swirling flow in a trap portion having a cylindrical shape, and includes:
  an inflow portion for causing the fluid to flow into the trap portion;
  a separation portion having a tubular structure and provided at a bottom part of the trap portion so as to separate the fluid having flowed in through the inflow portion into an inner fluid having the swirling flow flowing inside the tubular structure and an outer fluid having the swirling flow flowing outside the tubular structure;
  an outflow portion for causing the inner fluid separated by the separation portion to flow out of the trap portion;
  a flow-straightening plate provided at a center part of the trap portion and above the inflow portion; and
  a gas-liquid separation portion which is provided at the center part of the trap portion and below the inflow portion, and inhibits the swirling flow from flowing toward the outflow portion.

Effect of the Invention

The foreign matter removal device according to the present disclosure can remove foreign matter such as iron rust and the like having a higher specific gravity than a fluid, and has a further improved capability of removing foreign matter such as air bubbles having a lower specific gravity than a fluid.

DESCRIPTION OF EMBODIMENTS

Figure 1:
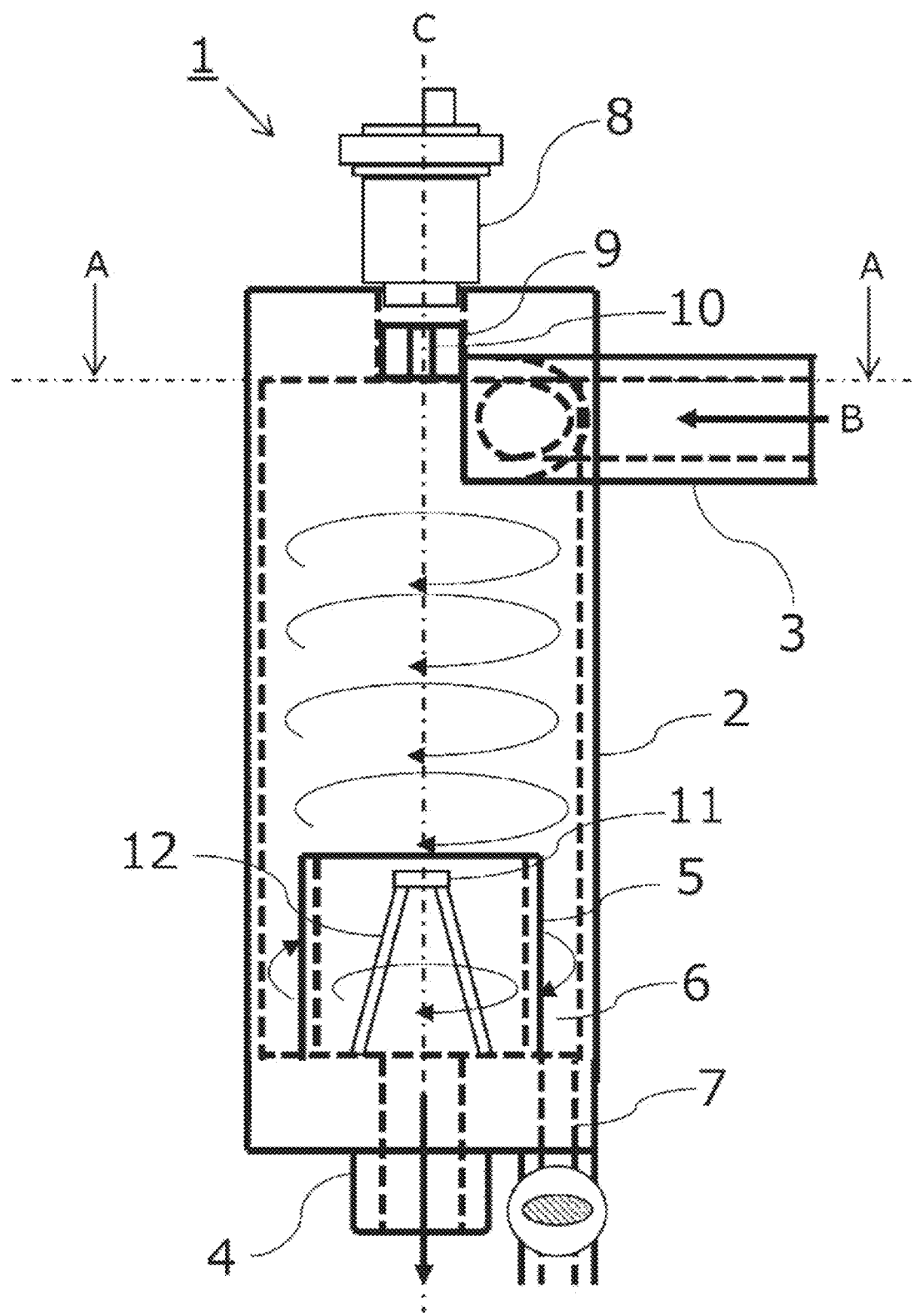
FIG. 1 schematically illustrates a foreign matter removal device according to embodiment 1.

Hereinafter, an embodiment of a foreign matter removal device according to the present disclosure will be described in detail with reference to the drawings. The embodiment described below is merely an example, and the present disclosure is not limited to the embodiment. Unless otherwise specified, a vertical direction represents the up-down direction on the drawing sheet, and a horizontal direction represents the left-right direction on the drawing sheet.

Embodiment 1

Figure 2:
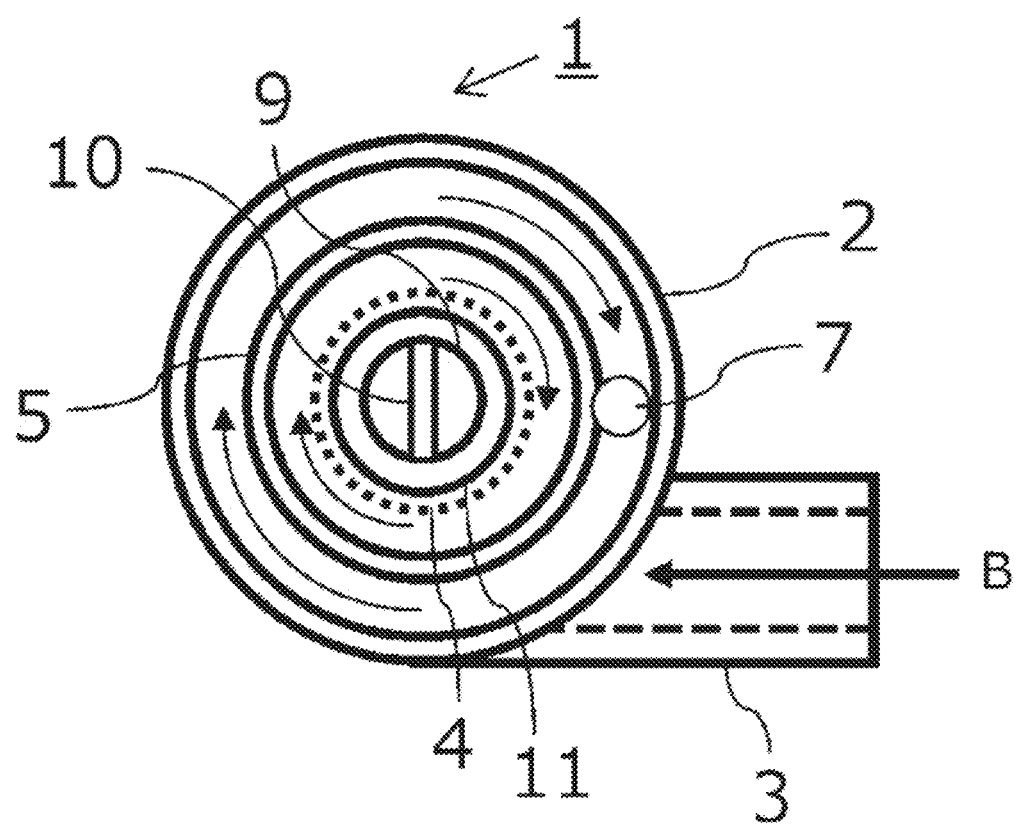
FIG. 2 shows the arrangement of components as seen from an A-A side in FIG. 1.
Figure 3:
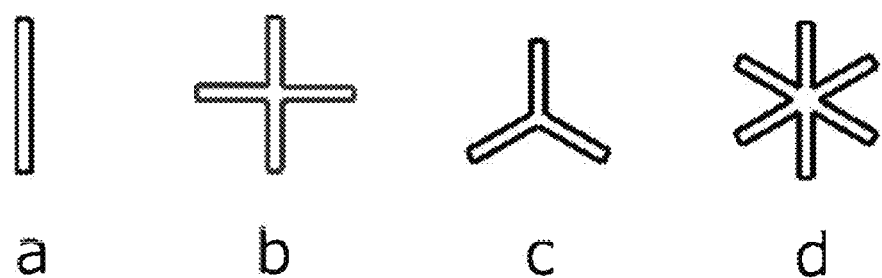
FIG. 3 illustrates shapes of a flow-straightening plate of the foreign matter removal device according to embodiment 1.

FIG. 1 schematically illustrates a foreign matter removal device 1 according to embodiment 1. FIG. 2 is a view as seen from an A-A side in FIG. 1. The foreign matter removal device 1 is mounted in a circuit in which a fluid such as water flows. The foreign matter removal device 1 is a device which removes foreign matter contained in an inflow fluid and causes the fluid to flow out, and includes a trap portion 2, an inflow portion 3, an outflow portion 4, a separation portion 5, a first-foreign-matter-capturing portion 6, first-foreign-matter-discharging means 7, second-foreign-matter-discharging means 8, a second-foreign-matter-discharging-means-connection portion 9, a flow-straightening plate 10, a gas-liquid separation portion 11, supporting columns 12, etc. In FIG. 1 and FIG. 2, the moving direction of a fluid flowing in the foreign matter removal device 1 is indicated by arrows. In the drawings, an inner wall or a non-visible part is shown transparently by a broken line.

The trap portion 2 is a hollow cylindrical structural body. When the foreign matter removal device 1 is mounted in a circuit in which a fluid flows, the trap portion 2 is placed so as to extend in a vertical direction as exemplified in FIG. 1. The trap portion 2 may be made of metal such as stainless steel, brass, copper, aluminum, or steel, or may be made of resin such as polytetrafluoroethylene (Teflon (registered trademark) resin), polyvinyl chloride, polyethylene, polystyrene, polypropylene, polysulfone, isoprene rubber, butadiene rubber, styrene butadiene rubber, aromatic polyamide (nylon 6, nylon 6-6, or the like), ABS (acrylonitrile-butadiene styrene), acryl, or carbon fiber reinforced plastic.

The inflow portion 3 forms a flow path for causing the fluid flowing in the circuit to flow into the trap portion 2. As exemplified in FIG. 1, one end of the inflow portion 3 is connected to an upper part of the trap portion 2 and the other end of the inflow portion 3 is connected to the circuit through a pipe, and the fluid enters in an arrow B direction from the circuit side.

The outflow portion 4 forms a flow path for causing the fluid flowing in the trap portion 2 to flow out of the trap portion 2 to the circuit. As exemplified in FIG. 1, one end of the outflow portion 4 is connected to the trap portion 2, and the other end of the outflow portion 4 is connected to the circuit through a pipe. An inner fluid having a swirling flow flowing inside a tubular structure of the separation portion 5 described below is caused to flow out of the trap portion 2 to the circuit through the outflow portion 4.

As exemplified in FIG. 2, the inflow portion 3 is so configured that the fluid having flowed through the inflow portion 3 forms a swirling flow in the trap portion 2. With this configuration, a fluid having flowed into the foreign matter removal device 1 is inhibited from linearly flowing out of the foreign matter removal device 1 through the outflow portion 4. In other words, the fluid having flowed into the trap portion 2 through the inflow portion 3 becomes a swirling flow which whirls and moves downward in the trap portion 2 along the outer circumference of the trap portion 2 having a circular horizontal cross section shown in FIG. 2, and the downward swirling flow flows to the outside through the outflow portion 4.

The separation portion 5 is a separation member for separating the fluid having flowed in through the inflow portion 3, between the outer circumference side and the center side in the trap portion 2. The separation portion 5 is a hollow tubular structural body placed at a specific distance inward from the outer circumference side of the trap portion 2, and is a cylindrical member in the present embodiment. Thus, as shown in FIG. 2, the inner diameter of the separation portion 5 is smaller than the inner diameter of the trap portion 2 in the location where the separation portion 5 is placed. Thus, a gap (hereinafter, first-foreign-matter-capturing portion 6) is formed between an inner wall of the trap portion 2 and the separation portion 5. With this configuration, the fluid having flowed into the foreign matter removal device 1 is separated into an inner fluid having a swirling flow flowing inside the separation portion 5 and an outer fluid having a swirling flow flowing outside the separation portion 5, in the trap portion 2.

As exemplified in FIG. 1, the separation portion 5 is placed at a lower part of the trap portion 2. For example, the separation portion 5 is placed at a bottom part of the trap portion 2 and below the inflow portion 3 in the vertical direction. The outflow portion 4 is also placed below the inflow portion 3 in the vertical direction in the same manner.

In addition, the separation portion 5 is placed approximately at the same position in the vertical direction as a connection portion, of the trap portion 2, to which the outflow portion 4 is connected. In the present embodiment, the outflow portion 4 is formed so as to communicate with the tubular structural body of the separation portion 5 and the trap portion 2.

With this configuration, foreign matter, such as iron rust contained in a fluid, having a higher specific gravity than the fluid (hereinafter, referred to as first foreign matter) is collected at the first-foreign-matter-capturing portion 6, and the inner fluid from which the first foreign matter has been removed flows out through the outflow portion 4.

As described above, in the foreign matter removal device 1, the fluid flows as a swirling flow in a cyclone form in the trap portion 2, to form a vortex. The rotation due to the vortex causes a centrifugal force to act, so that the fluid is pushed outward. That is, in the trap portion 2, the pressure of the fluid is higher on the outer side and lower on the center side. Furthermore, foreign matter such as air bubbles having a lower specific gravity than a fluid (hereinafter, referred to as second foreign matter) gathers at the center or around the center in the horizontal direction of the trap portion 2 due to such pressure difference, and floats up due to the difference in specific gravity between the foreign matter and the fluid.

Meanwhile, the first foreign matter moves to the outer circumference side in the trap portion 2 due to such pressure difference, and gathers at the lower part of the trap portion 2 due to gravity settling. In other words, the first foreign matter gathers outside the separation portion 5 in the trap portion 2. Thus, the fluid from which not only the first foreign matter but also the second foreign matter have been appropriately removed flows out through the outflow portion 4.

In the first-foreign-matter-capturing portion 6 for capturing the first foreign matter, the first foreign matter having a higher specific gravity and settled by gravity is captured. The first-foreign-matter-discharging means 7 is provided at the first-foreign-matter-capturing portion 6 so as to extend downward from the bottom part of the trap portion 2 in the vertical direction.

The first-foreign-matter-discharging means 7 discharges the first foreign matter captured at the first-foreign-matter-capturing portion 6. The first-foreign-matter-discharging means 7 is, for example, a valve, and, in an opened state thereof, the first foreign matter captured at the first-foreign-matter-capturing portion 6 is discharged to the outside. Since the first-foreign-matter-discharging means 7 is provided, in the case where the first foreign matter is captured at the first-foreign-matter-capturing portion 6, the first foreign matter is discharged to the outside, so that the amount of the first foreign matter captured at the first-foreign-matter-capturing portion 6 can be reduced. Thus, even if the foreign matter removal device 1 is used for a long time, the foreign matter removal device 1 can continuously capture the first foreign matter in an effective manner.

The second-foreign-matter-discharging means 8 discharges the second foreign matter which gathers at a center part of the trap portion 2. The second-foreign-matter-discharging means 8 is, for example, an air valve, and, in an opened state thereof, the second foreign matter which has gathered at the center part of the trap portion 2 and has floated up is discharged to the outside.

The second-foreign-matter-discharging-means-connection portion 9 serves to connect the second-foreign-matter-discharging means 8 to the trap portion 2. As shown in FIG. 1, the second-foreign-matter-discharging-means-connection portion 9 is, specifically, a space that opens upward from a ceiling which is the uppermost part of the inner wall at the center of the trap portion 2 above the inflow portion 3 and upward of the outflow portion 4 in the vertical direction. With this configuration, the second foreign matter which has gathered at the center part of the trap portion 2 and has floated up flows into the second-foreign-matter-discharging-means-connection portion 9, and floats up toward the second-foreign-matter-discharging means 8.

The flow-straightening plate 10 is provided at the second-foreign-matter-discharging-means-connection portion 9, and causes the second foreign matter having flowed into the second-foreign-matter-discharging-means-connection portion 9 to float up. The flow-straightening plate 10 is shaped so as to divide an opening of the second-foreign-matter-discharging-means-connection portion 9 as shown in FIGS. 3a to 3d, and reduces the swirling flow in the second-foreign-matter-discharging-means-connection portion 9, so that the second foreign matter having flowed into the second-foreign-matter-discharging-means-connection portion 9 can be floated up toward the second-foreign-matter-discharging means 8. In addition, owing to the second-foreign-matter-discharging-means-connection portion 9 and the flow-straightening plate 10, malfunction of the second-foreign-matter-discharging means 8 to be caused by the downward swirling flow generated at the center of the trap portion 2 can be inhibited. For example, occurrence of such a phenomenon that a float in an air venting valve in the second-foreign-matter-discharging means 8 sinks due to the downward swirling flow and thus water leak or the like occurs, can be suppressed.

The gas-liquid separation portion 11 is a member for inhibiting the downward swirling flow generated at the center of the trap portion 2. The gas-liquid separation portion 11 is placed inside the trap portion 2 and below the inflow portion 3, and is supported by the supporting columns 12 which are rod-shaped members, and the supporting columns 12 are fixed to the bottom part of the trap portion 2. The gas-liquid separation portion 11 is preferably placed in a direction in which the second foreign matter having gathered at the center part of the trap portion 2 moves downward, and is placed in the separation portion 5 on a center axis C connecting the centers of both bottom surfaces of the trap portion 2 having a cylindrical shape. The outflow portion 4 and the second-foreign-matter-discharging-means-connection portion 9 are also placed on the center axis C, and are placed concentrically with each other as in FIG. 2.

Figure 4:
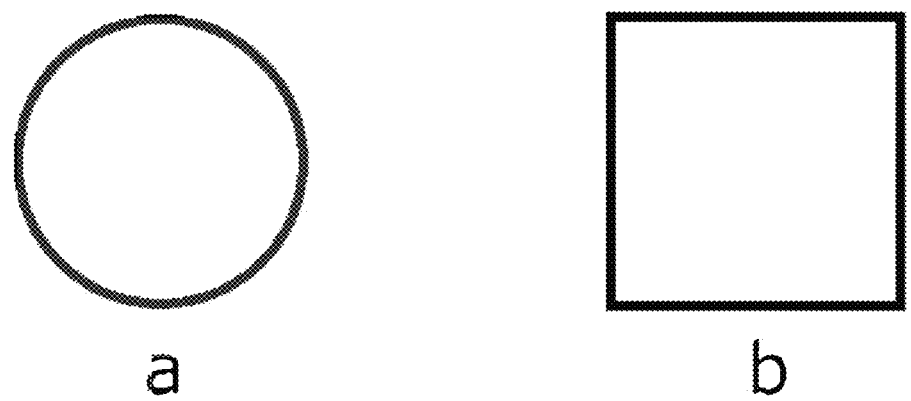
FIG. 4 illustrates shapes of a gas-liquid separation portion of the foreign matter removal device according to embodiment 1.

The gas-liquid separation portion 11 is a circular plate-shaped member as shown in FIG. 2, but, as shown in the shapes of horizontal cross sections (vertical to the center axis C) in FIGS. 4a, 4b, may be a circular or polygonal plate-shaped member. In addition, the area of the horizontal cross section of the gas-liquid separation portion 11 may be smaller than that of the outflow portion 4. In the case where the area of the horizontal cross section of the gas-liquid separation portion 11 is smaller than that of the outflow portion 4, the effect of inhibiting the downward swirling flow becomes small, but the pressure loss of the foreign matter removal device 1 can be reduced. As shown in FIG. 1, the plate-shaped member of the gas-liquid separation portion 11 extends in a direction vertical to a direction of flowing out through the outflow portion 4.

The gas-liquid separation portion 11 provided in such a manner inhibits the second foreign matter which has flowed into the trap portion 2 through the inflow portion 3 and has gathered at the center part in the trap portion 2 from being moved toward the outflow portion 4 by the downward swirling flow, and causes the second foreign matter to remain in the trap portion 2, while promoting the second foreign matter to float up toward the second-foreign-matter-discharging means 8.

Figure 5:
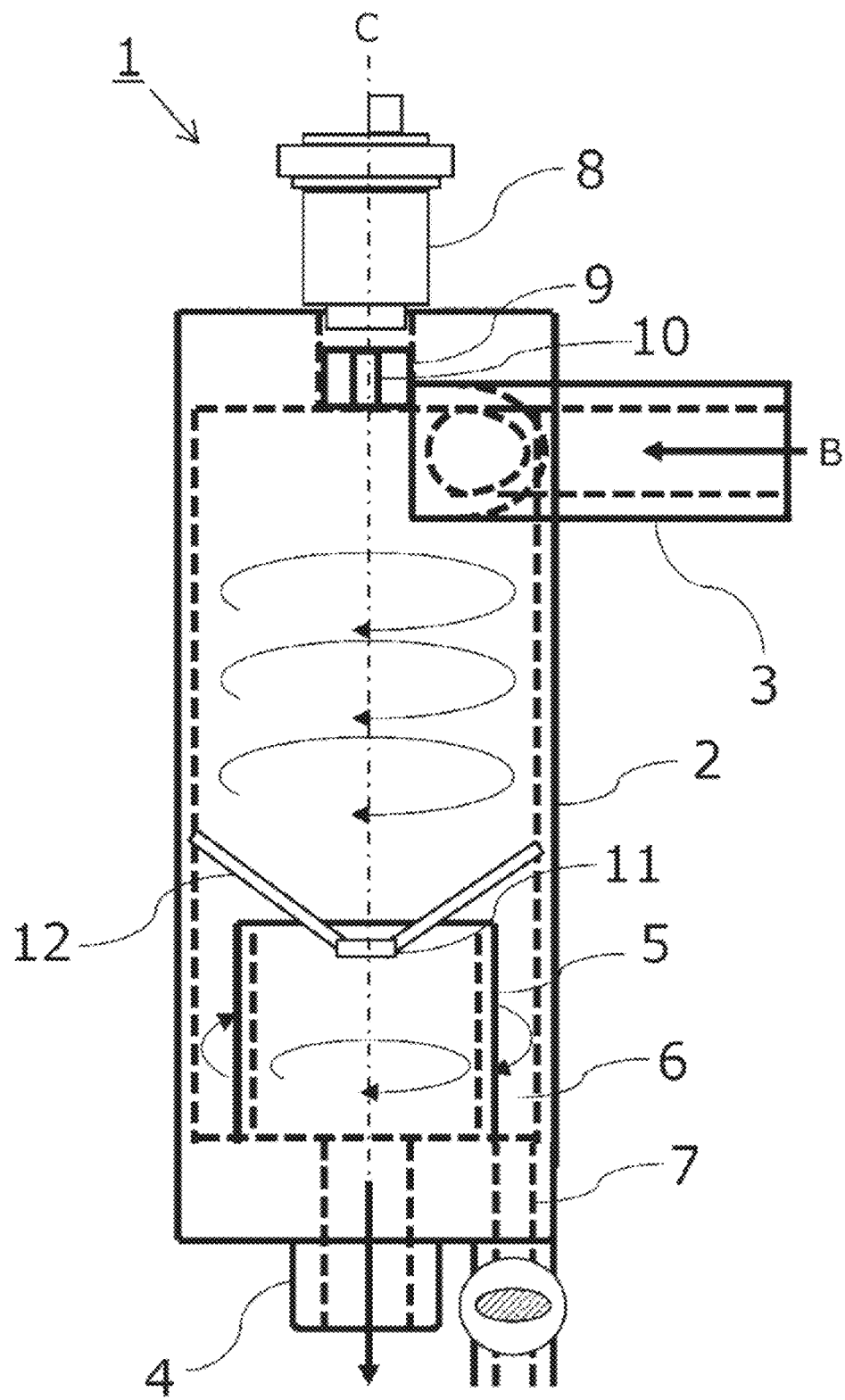
FIG. 5 illustrates the foreign matter removal device according to embodiment 1 in a state in which the gas-liquid separation portion is mounted in a different manner.

The gas-liquid separation portion 11 is supported by the supporting columns 12 fixed to the bottom part of the trap portion 2 in FIG. 1, but may be supported by the supporting columns 12 fixed to an inner surface of the trap portion 2 as shown in FIG. 5. In addition, the gas-liquid separation portion 11 may be supported by supporting columns extending from a side surface of the separation portion 5. The effect of inhibiting the downward swirling flow heading toward the outflow portion 4 becomes larger when the gas-liquid separation portion 11 is placed within the separation portion 5 compared to when the gas-liquid separation portion 11 is placed outside the separation portion 5.

As described above, the foreign matter removal device according to the present embodiment can remove foreign matter such as iron rust having a higher specific gravity than a fluid, that is, the first foreign matter, and has a further improved capability of removing foreign matter such as air bubbles having a lower specific gravity than a fluid, that is, the second foreign matter.

Although the present disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS

1 foreign matter removal device
2 trap portion
3 inflow portion
4 outflow portion
5 separation portion
6 first-foreign-matter-capturing portion
7 first-foreign-matter-discharging means
8 second-foreign-matter-discharging means
9 second-foreign-matter-discharging-means-connection portion
10 flow-straightening plate
11 gas-liquid separation portion
12 supporting column

The invention claimed is:

1. A foreign matter removal device which removes foreign matter contained in a fluid in a pipe by using a swirling flow in a trap having a cylindrical shape, the foreign matter removal device comprising:
   an inlet for causing the fluid to flow into the trap;
   a tubular structure provided at a bottom part of the trap so as to separate the fluid having flowed in through the inlet into an inner fluid having the swirling flow flowing inside the tubular structure and an outer fluid having the swirling flow flowing outside the tubular structure;
   a gap between an inner wall of the trap and the tubular structure, which captures higher specific gravity foreign matter than that of the fluid and settled by gravity;
   an outlet for causing the inner fluid from which the higher specific gravity foreign matter has been separated by the tubular structure to flow out of the trap;
   an opened space located vertically above the outlet, is located opposite the outlet in a center of the trap above the inlet, and the opened space to remove small specific gravity foreign matter;
   another outlet connected to the opened space to discharge the small specific gravity foreign matter;
   a plate shaped so as to divide an opening of the opened space in the vertical direction, so that the small specific gravity foreign matter having flowed into the opened space is promoted floating up toward the other outlet; and
   a gas-liquid separator which is provided at a center part of the trap and below the inlet, has a horizontal cross section whose area is smaller than that of the outlet, and inhibits the swirling flow from flowing toward the outlet.

2. The foreign matter removal device according to claim 1, wherein a discharge outlet discharges the higher specific gravity foreign matter captured at the gap.

3. The foreign matter removal device according to claim 1, wherein the outlet is located below the inlet.

4. The foreign matter removal device according to claim 1, wherein the gas-liquid separator is a plate-shaped member extending in a direction vertical to the swirling flow flowing toward the outlet.

5. The foreign matter removal device according to claim 1, wherein the gas-liquid separator is supported by a supporting column extending from the bottom part of the trap.

6. The foreign matter removal device according to claim 1, wherein the gas-liquid separator is supported by a supporting column extending from an inner surface of the trap.

7. The foreign matter removal device according to claim 1, wherein an inner surface of the tubular structure and an outer surface of the outlet are horizontally connected to form the bottom part of the trap.

8. The foreign matter removal device according to claim 2, wherein an inner surface of the tubular structure and an outer surface of the outlet are horizontally connected to form the bottom part of the trap.

9. The foreign matter removal device according to claim 2, wherein the outlet is located below the inlet.

10. The foreign matter removal device according to claim 2, wherein the gas-liquid separator is a plate-shaped member extending in a direction vertical to the swirling flow flowing toward the outlet.

11. The foreign matter removal device according to claim 3, wherein the gas-liquid separator is a plate-shaped member extending in a direction vertical to the swirling flow flowing toward the outlet.

12. The foreign matter removal device according to claim 2, wherein the gas-liquid separator is supported by a supporting column extending from the bottom part of the trap.

13. The foreign matter removal device according to claim 3, wherein the gas-liquid separator is supported by a supporting column extending from the bottom part of the trap.

14. The foreign matter removal device according to claim 2, wherein the gas-liquid separator is supported by a supporting column extending from an inner surface of the trap.

15. The foreign matter removal device according to claim 3, wherein the gas-liquid separator is supported by a supporting column extending from an inner surface of the trap.

16. The foreign matter removal device according to claim 1, wherein the gas-liquid separator, which is provided at the center part of the trap and below the inlet, has the horizontal cross section whose area is smaller than that of the outlet, and inhibits the swirling flow from flowing toward the outlet, is supported by a supporting column extending from inside the tubular structure.

17. The foreign matter removal device according to claim 1, wherein the gas-liquid separator, which is provided at the center part of the trap and below the inlet, has the horizontal cross section whose area is smaller than that of the outlet, and inhibits the swirling flow from flowing toward the outlet, is supported by a supporting column extending from above the tubular structure.

18. The foreign matter removal device according to claim 1, wherein
   the gas-liquid separator, which is provided at the center part of the trap and below the inlet, has the horizontal cross section whose area is smaller than that of the outlet, and inhibits the swirling flow from flowing toward the outlet, is supported by a supporting column extending from inside the tubular structure, and
   an inner surface of the trap is perpendicular to a bottom surface of the bottom part of the trap.

19. The foreign matter removal device according to claim 1, wherein the opened space is disposed within a housing of the foreign matter removal device.

20. The foreign matter removal device according to claim 19, wherein a majority of the other outlet is disposed outside of the housing of the foreign matter removal device.

* * * * *